United States Patent
Oh et al.

(10) Patent No.: US 7,983,800 B2
(45) Date of Patent: Jul. 19, 2011

(54) APPARATUS AND METHOD FOR CONTROLLING FAN MOTOR OF AIR CONDITIONER

(75) Inventors: Seung-Suk Oh, Gyeonggi-do (KR); Dong-Il Lee, Gyeonggi-do (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/096,269

(22) PCT Filed: Dec. 27, 2006

(86) PCT No.: PCT/KR2006/005769
§ 371 (c)(1),
(2), (4) Date: Jun. 5, 2008

(87) PCT Pub. No.: WO2007/075046
PCT Pub. Date: Jul. 5, 2007

(65) Prior Publication Data
US 2009/0043426 A1  Feb. 12, 2009

(30) Foreign Application Priority Data

Dec. 28, 2005 (KR) .................... 10-2005-0132616

(51) Int. Cl.
| | |
|---|---|
| G05D 23/00 | (2006.01) |
| H02P 6/00 | (2006.01) |
| B01F 3/02 | (2006.01) |
| F24F 6/00 | (2006.01) |
| H02P 25/18 | (2006.01) |
| H02P 27/04 | (2006.01) |

(52) U.S. Cl. ....... 700/299; 700/300; 165/229; 236/44 R; 318/400.01; 318/788; 318/807

(58) Field of Classification Search .................... 62/161; 318/400.01, 788, 807; 700/299, 300; 165/229; 236/44 R, 84; 702/132
See application file for complete search history.

(56) References Cited

U.S. PATENT DOCUMENTS

| | | | |
|---|---|---|---|
| 4,102,389 A * | 7/1978 | Wills | 165/231 |
| 4,469,166 A * | 9/1984 | Aschoff et al. | 165/253 |
| 5,014,522 A * | 5/1991 | Noji et al. | 62/227 |
| 5,161,388 A * | 11/1992 | Fujita et al. | 62/175 |
| 5,161,739 A * | 11/1992 | Saito et al. | 237/9 R |

(Continued)

FOREIGN PATENT DOCUMENTS

JP  2001-292589  10/2001

(Continued)

OTHER PUBLICATIONS

Yamada et al., "New High-Speed Induction Motor Driven by a Commercial Source", 1987, IEEE, p. 3020-3022.*

(Continued)

*Primary Examiner* — Albert Decady
*Assistant Examiner* — Thomas H Stevens
(74) *Attorney, Agent, or Firm* — KED & Associates LLP

(57) ABSTRACT

An apparatus for controlling a fan motor of an air conditioner comprises: a hybrid induction motor (HIM) for discharging warm air outwardly by a control signal; a temperature detecting unit for detecting a temperature of an evaporator; and a controlling unit for comparing the temperature of the evaporator with a preset temperature, and outputting a control signal to control the HIM based on a result of the comparison.

15 Claims, 4 Drawing Sheets

U.S. PATENT DOCUMENTS

| | | | |
|---|---|---|---|
| 5,165,250 A * | 11/1992 | Nagatomo et al. | 62/158 |
| 5,193,042 A * | 3/1993 | Espinoza et al. | 361/79 |
| 5,203,179 A * | 4/1993 | Powell | 62/180 |
| 5,303,562 A * | 4/1994 | Bahel et al. | 62/222 |
| 5,345,776 A * | 9/1994 | Komazaki et al. | 62/176.3 |
| 5,424,720 A * | 6/1995 | Kirkpatrick | 340/585 |
| 5,747,833 A | 5/1998 | Fujisaki et al. | |
| 5,934,084 A * | 8/1999 | Lee | 62/93 |
| 6,118,239 A * | 9/2000 | Kadah | 318/268 |
| 6,930,464 B2 * | 8/2005 | Han et al. | 318/781 |
| 6,968,295 B1 * | 11/2005 | Carr | 702/188 |
| 7,081,733 B2 * | 7/2006 | Han et al. | 318/400.01 |
| 7,708,056 B2 * | 5/2010 | Shen et al. | 165/247 |
| 2002/0027253 A1 * | 3/2002 | Kohno et al. | 257/370 |
| 2002/0043962 A1 * | 4/2002 | Taniguchi et al. | 322/28 |
| 2004/0139256 A1 * | 7/2004 | Lee | 710/104 |
| 2005/0073206 A1 * | 4/2005 | Wilsdorf | 310/178 |
| 2006/0061321 A1 | 3/2006 | Han et al. | |
| 2006/0108969 A1 | 5/2006 | Han et al. | |
| 2006/0122732 A1 * | 6/2006 | Shinomoto et al. | 700/275 |

FOREIGN PATENT DOCUMENTS

KR    20-1995-0020067    7/1995

OTHER PUBLICATIONS

Stallcup, J., :Code Issues: Modern Starting and Controlling Methods for Motors, 2005, Necdigest, p. 24-29.*
Goleman-R., "Basic Properties of a Single-Phase Hybrid Motor Prototype" 1996, Elsevier, p. 75-76.*
English language Abstract of JP 2001-292589, Oct. 19, 2001.
English language Abstract of KR 20-1995-0020067, Jul. 26, 1995.

* cited by examiner

PRIOR ART

PRIOR ART

APPARATUS AND METHOD FOR CONTROLLING FAN MOTOR OF AIR CONDITIONER

BACKGROUND OF THE INVENTION

1. Field of the Invention

The present invention relates to an apparatus and method for controlling a fan motor of an air conditioner, and more particularly, to an apparatus and method for controlling a fan motor of an air conditioner capable of driving an outdoor fan with using a hybrid induction motor (HIM), and capable of restoring a positive temperature coefficient (PTC) of the HIM to a normal state at the time of a breakdown occurrence by cutting off power supplied to the HIM.

2. Description of the Background Art

In general, a single-phase induction motor is widely used as a fan motor of an air conditioner due to a low cost.

However, since the single-phase induction motor has a low efficiency, research to improve efficiency of the fan motor by controlling power of the air conditioner is being performed.

Accordingly, a brushless direct current (BLDC) motor driven by a microcomputer is being used as the fan motor of the air conditioner.

However, the BLDC motor requires a driving circuit thus to cause a high cost.

To solve the problem, a hybrid induction motor (HIM) of a high efficiency is being used as the fan motor of the air conditioner.

FIG. 1 is a sectional view showing a hybrid induction motor (HIM) in accordance with the conventional art, and FIG. 2 is a partial planar view showing a stator core of FIG. 1.

As shown, the HIM comprises a stator 10, a squirrel type rotor 30 disposed in the stator 10 so as to be rotatable centering around a rotation shaft 31, and a permanent magnet rotor 40 disposed between the stator 10 and the squirrel type rotor 30 so as to be rotatable centering around the rotation shaft 31.

The squirrel type rotor 30 includes a rotor core 35 formed of a plurality of steel plates 36 insulation-laminated together, and a plurality of conductive bars 37 penetratingly-formed at the rotor core 35 in a circumferential direction of the rotor core 35 with an interval therebetween by a die casting method.

The permanent magnet rotor 40 includes a permanent magnet 43 having a circular shape or a cylindrical shape, and arranged at a circumferential portion of the squirrel type rotor 30 so that an S-pole and an N-pole may be alternately implemented; and a magnet supporting member 44 having one end free-rotatably coupled to the rotation shaft 31 and another end coupled to the permanent magnet 43, for supporting the permanent magnet 43.

The stator 10 includes a stator core 11 formed of a plurality of steel plates 13 insulation-laminated together, each steel plate having a disc shape and having a plurality of slots 14c of the same size W in a circumferential direction thereof; a stator coil 21 wound on the stator core 11; and a protecting portion 50 formed at a circumferential portion of the stator coil 21 by a molding method. A shaft supporting bracket 52 having a bearing 54 so as to rotatably support the rotation shaft 31 is integrally coupled to both sides of the protecting portion 50.

Each of the steel plates 13 of the stator core 11 includes a ring-shaped yoke 14a; and a plurality of teeth 14b protruding from an inner side of the yoke 14a towards the center of the steel plate in a radial direction, and having a constant interval therebetween so that a slot 14c of the same size W may be formed therebetween in a circumferential direction. The stator coil 21 has a main coil 22 and a sub coil 24 wound on each slot 14c and having different phases from each other.

FIG. 3 a schematic view showing a configuration of an air conditioner having the HIM.

As shown, the HIM is applied to an outdoor fan, and is rotated by a driving circuit.

A controlling unit 1 controls supply of cooling air by detecting an indoor temperature.

FIG. 4 is a view showing a driving circuit of the HIM.

Referring to FIG. 4, when power is supplied to the HIM, a rotating magnetic field is generated by a current flowing on a main winding coil (ML), a subsidiary winding coil (SL), and a starting capacitor (Cs).

When the rotating magnetic field is generated by the current flowing on the subsidiary winding coil (SL), a synchronous rotor is synchronized and then rotates at a synchronous speed.

By the synchronous rotor implemented as a magnet, a rotating magnetic field having an intensive flux is generated and thereby an induction rotor rotates.

A positive temperature coefficient (PTC) of the HIM is turned off as a certain time lapses.

By the current flowing on the main winding coil (ML), the subsidiary winding coil (SL), and a driving capacitor (Cr), the induction rotor is rotated.

When the induction rotor rotates, a rotational force of the induction rotor is transmitted to the air conditioner through the rotation shaft.

In case that a fan is coupled to the rotation shaft, the fan generates an air flow while being rotated.

FIG. 5 is a circuit view showing a configuration of a speed varying apparatus of the HIM.

Referring to FIG. 5, the speed varying apparatus of the HIM includes a main coil (ML), a first speed varying coil (VL1), and a second speed varying coil (VL2); first and second switches SW1 and SW2 for selecting the main coil (ML), the first speed varying coil (VL1), and the second speed varying coil (VL2) by a control signal; and a control unit 100 for outputting a control signal to vary a speed of the HIM by a user's command.

The controlling unit 100 analyzes a command inputted from outside, and outputs a control signal to control the first and second switches SW1 and SW2 based on the analysis result.

The first and second switches SW1 and SW2 are respectively switched by the control signal, and a speed of the HIM is varied by changing the number of windings of the coil.

The more the number of windings of the coil is increased, the HIM is operated at a low speed.

For instance, when a user inputs a command to operate the HIM with a high speed, the controlling unit 100 outputs a control signal so that only the main coil (ML) may be selected. Accordingly, the first and second switches SW1 and SW2 are switched, and the HIM rotates at a high speed by the current flowing on the main winding coil (ML), the subsidiary winding coil (SL), and the driving capacitor (Cr).

When the HIM is to be operated at a low speed, the current flowing on the main coil (ML), the first and second speed varying coils (VL1, VL2), and the driving capacitor (Cr) is applied to the HIM.

When the HIM is to be operated at a middle speed, the current flowing on the main coil (ML), the first speed varying coil (VL1), and the driving capacitor (Cr) is applied to the HIM.

When the HIM is coupled to an outdoor fan of the air conditioner, the outdoor fan generates an air flow while being rotated. Accordingly, warm air is discharged outward.

However, the HIM applied to the outdoor fan causes breakdown when backwind or a low voltage is applied thereto from outside. The PTC of the HIM is not restored to the original state (normal state) even if the backwind or the low voltage is removed.

Accordingly, the air conditioner is not re-started thus to have a low reliability.

SUMMARY OF THE INVENTION

Therefore, an object of the present invention is to provide an apparatus and method for controlling a fan motor of an air conditioner capable of enhancing a reliability by driving an outdoor fan with using a hybrid induction motor (HIM), by restoring a positive temperature coefficient (PTC) of the HIM to a normal sate at the time of a breakdown occurrence by cutting off power supplied to the HIM, and by re-starting the HIM when the breakdown is solved.

To achieve these and other advantages and in accordance with the purpose of the present invention, as embodied and broadly described herein, there is provided an apparatus for controlling a fan motor of an air conditioner. The apparatus may include a hybrid induction motor (HIM), a temperature detecting unit and a controlling unit. The HIM discharges warm air outwardly by a control signal. The temperature detecting unit detects a temperature of an evaporator. The controlling unit compares the temperature of the evaporator with a preset temperature, and outputs a control signal to control the HIM based on a result of the comparison.

According to another aspect of the present invention, the apparatus for controlling a fan motor of an air conditioner may include a hybrid induction motor (HIM), a temperature detecting unit and a controlling unit. The HIM discharges warm air outwardly by rotating a fan when power is supplied thereto by a control signal. The temperature detecting unit for detecting a temperature of an evaporator. The controlling unit compares the temperature of the evaporator with a preset temperature, and controls power supply to the HIM based on a result of the comparison.

To achieve these and other advantages and in accordance with the purpose of the present invention, as embodied and broadly described herein, there is also provided a method for controlling a fan motor of an air conditioner. The method may include discharging warm air outwardly by driving a fan with using a hybrid induction motor (HIM), The method may also include detecting a temperature of an evaporator. The method may also include comparing the temperature of the evaporator with a preset temperature, and controlling a driving of the HIM based on a result of the comparison.

According to another aspect of the present invention, the method for controlling a fan motor of an air conditioner may include discharging warm air outwardly by driving a fan with using a hybrid induction motor (HIM). The method may also include detecting a temperature of an evaporator. The method may further include comparing the temperature of the evaporator with a preset temperature, and cutting off power supply to the HIM based on a result of the comparison.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, will be explained an apparatus and method for controlling a fan motor of an air conditioner capable of enhancing a reliability by driving an outdoor fan with using a hybrid induction motor (HIM), by restoring a positive temperature coefficient (PTC) of the HIM to a normal sate at the time of a breakdown occurrence by cutting off power supplied to the HIM, and by re-starting the HIM when the breakdown is solved.

In the present invention, an air conditioner having a hybrid induction motor (HIM) mounted at an outdoor fan is explained. A driving circuit of the HIM is provided with a switch for supplying or cutting off power thereto.

When breakdown of the HIM occurs due to backwind or a low voltage applied to the outdoor fan from outside, warm air is not discharged outwardly and thus a temperature of cool air from an indoor unit is increased.

In the present invention, when the cool air from the indoor unit has a temperature more than a certain degree, it is judged that the outdoor fan is not normally operated. Then, a PTC of the HIM is restored to the original state (normal state) by cutting off power supplied to the HIM, thereby enhancing a reliability of the air conditioner.

Figure 6:
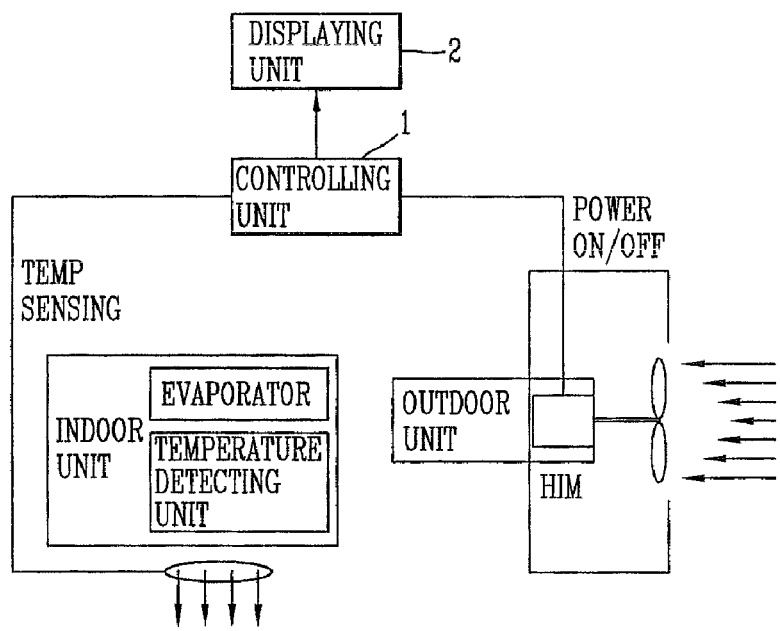
FIG. 6 is a schematic view showing an apparatus for controlling a fan motor of an air conditioner using a hybrid induction motor (HIM) according to a first embodiment of the present invention.

FIG. 6 is a schematic view showing an apparatus for controlling a fan motor of an air conditioner using a hybrid induction motor (HIM) according to a first embodiment of the present invention.

As shown, the apparatus for controlling a fan motor of an air conditioner using a hybrid induction motor (HIM) according to the present invention comprises a temperature detecting unit, a hybrid induction motor (HIM), a controlling unit 1, and a displaying unit 2.

The temperature detecting unit is installed at an evaporator or near the evaporator to detect a temperature of the evaporator.

The HIM is mounted at an outdoor fan.

The HIM is driven by a control signal, and discharges warm air outwardly by rotating a fan.

Figure 1:
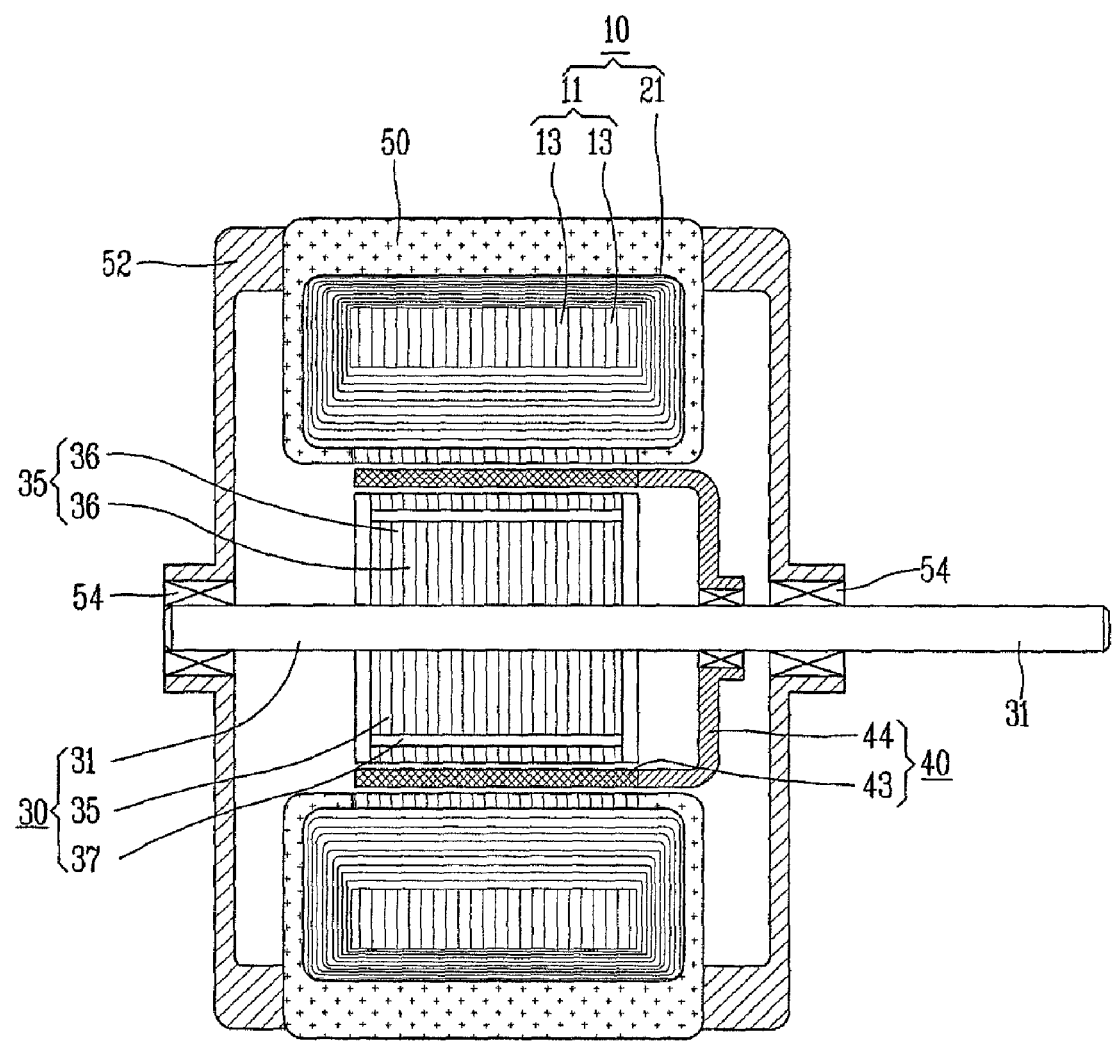
FIG. 1 is a sectional view showing a hybrid induction motor (HIM) in accordance with the conventional art.
Figure 2:
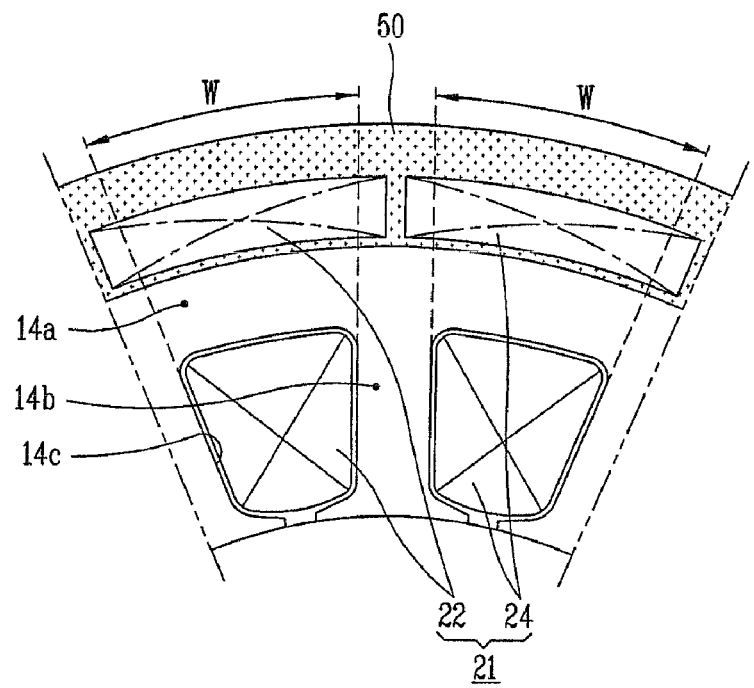
FIG. 2 is a partial planar view showing a stator core of FIG. 1.
Figure 3:
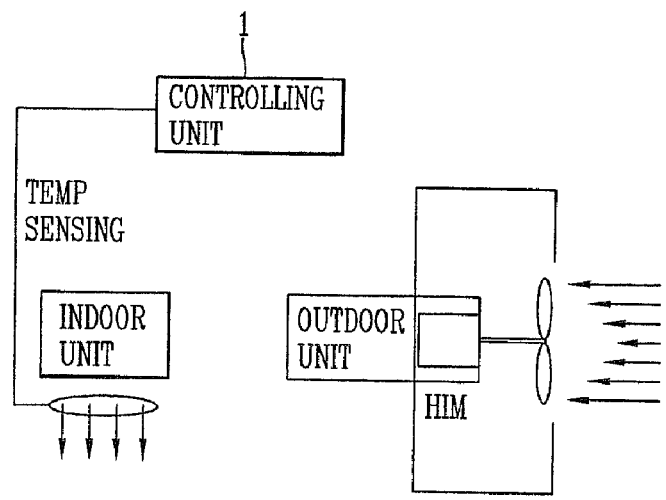
FIG. 3 a schematic view showing a configuration of an air conditioner having the HIM.
Figure 4:
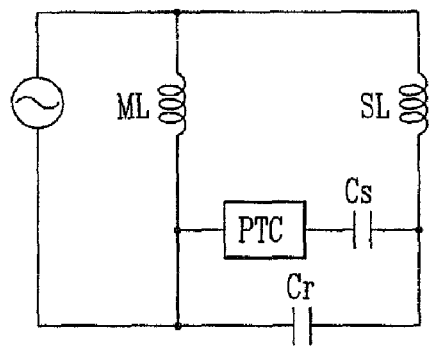
FIG. 4 is a view showing a driving circuit of the HIM.
Figure 5:
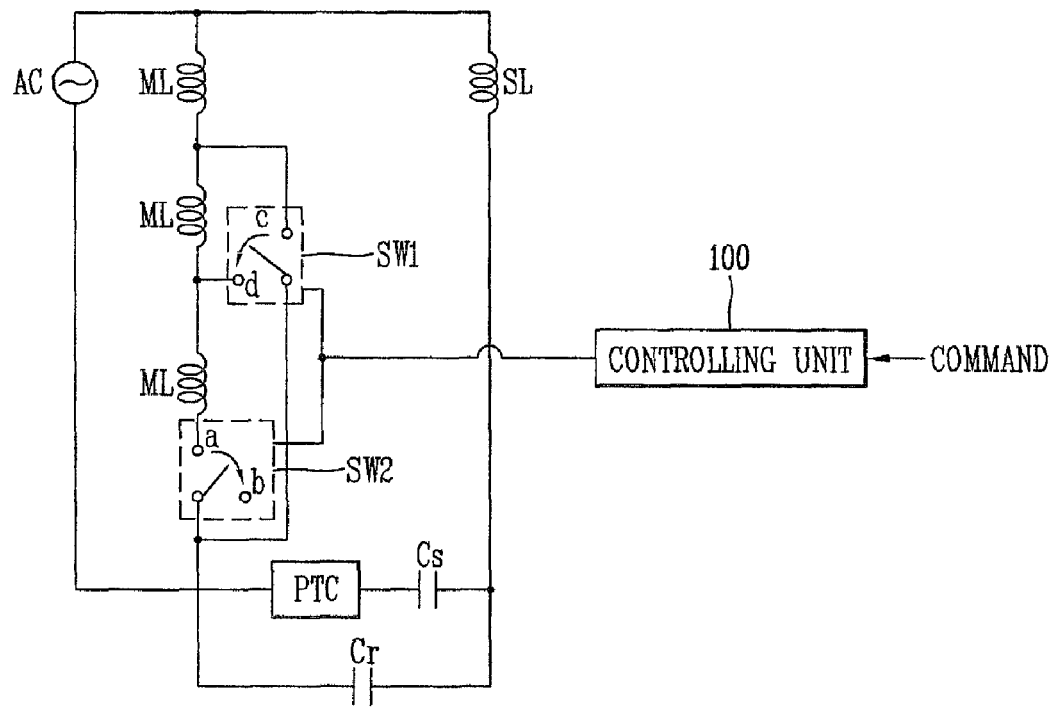
FIG. 5 is a circuit view showing a configuration of a speed varying apparatus of the HIM.

The HIM has the same driving circuit as that of FIG. 4, and is provided with a switching unit (not shown) for supplying or cutting off power thereto.

The controlling unit 1 compares a temperature of the evaporator detected by the temperature detecting unit with a preset temperature, and controls power supply to the HIM based on a result of the comparison. Also, the controlling unit 1 controls a driving state of the HIM to be displayed.

When the temperature of the evaporator is higher than the preset temperature, the controlling unit 1 judges that breakdown has occurred thus to cut-off power supplied to the HIM.

The preset temperature is a reference temperature by which whether or not breakdown has occurred is judged.

The preset temperature is preset by an experiment, and is stored in a storing unit (not shown).

The displaying unit 2 displays a driving state of the HIM by the controlling unit 1. Accordingly, at the time of breakdown occurrence, a user can remove a cause of the breakdown and then re-start the HIM.

Figure 7:
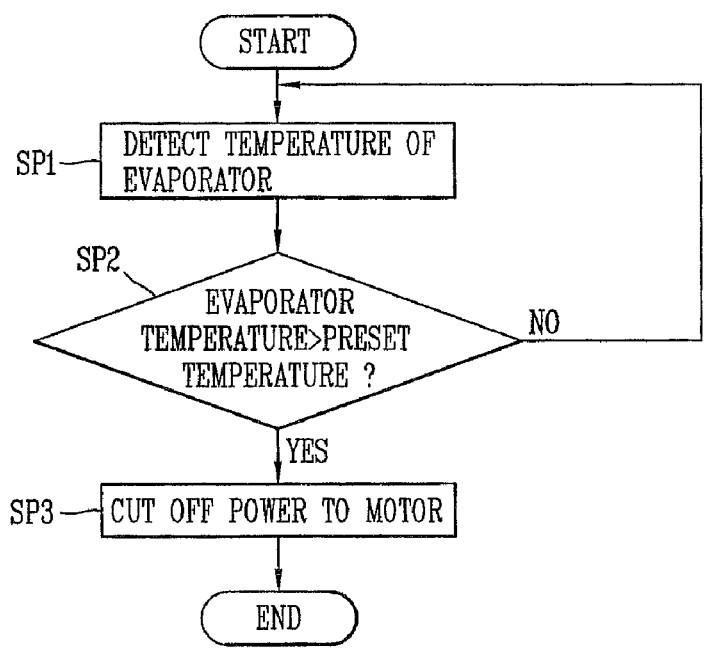
FIG. 7 is a flowchart showing a method for controlling a fan motor of an air conditioner using a hybrid induction motor (HIM) according to a first embodiment of the present invention.

An operation of the air conditioner according to the present invention will be explained with reference to FIG. 7.

The temperature detecting unit periodically detects a temperature of the evaporator thus to apply it to the controlling unit (SP1).

The controlling unit 1 compares the temperature of the evaporator outputted from the temperature detecting unit with a preset temperature, and detects whether or not breakdown has occurred based on a result of the comparison (SP2).

When the temperature of the evaporator is higher than the preset temperature, the controlling unit 1 judges that breakdown has occurred.

When breakdown of the HIM occurs due to backwind or a low voltage applied to the outdoor fan from outside, warm air is not discharged outwardly and thus a temperature of cool air from an indoor unit is increased.

When the breakdown is detected, the controlling unit 1 cuts off power supplied to the HIM (SP3) and thereby power supplied to a PTC of a driving circuit of the HIM is cut-off. Accordingly, the PTC of the HIM is restored to the original state (normal state).

The controlling unit 1 displays that the outdoor fan is in an abnormal state on the displaying unit 3 when the breakdown is detected.

The controlling unit 1 generates an alarm signal informing that the outdoor fan is in an abnormal state when the breakdown is detected.

Accordingly, the user detects an abnormal state of the outdoor fan due to the breakdown, and re-starts the HIM by removing a cause of the breakdown thus to enhance reliability of the air conditioner.

As aforementioned, in the present invention, the outdoor fan is driven with using a hybrid induction motor (HIM), and power supplied to the HIM is cut-off at the time of breakdown occurrence. Accordingly, the PTC of the HIM is restored to the original state (normal state), and the HIM is re-started when a cause of the breakdown is removed thus to enhance the reliability of the air conditioner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for controlling a fan motor of an air conditioner, the apparatus comprising:
a hybrid induction motor (HIM) mounted at an outdoor fan for discharging warm air outwardly based on a control signal;
a temperature detecting unit for detecting a temperature of cooling air from an evaporator of an indoor unit; and
a controlling unit for comparing the temperature of the cooling air from the evaporator with a preset temperature, determining whether a breakdown has occurred, and outputting a control signal to control the HIM based on a result of the comparison,
wherein when the temperature of the cooling air from the evaporator of an indoor unit is higher than the preset temperature, the controlling unit stops the HIM.

2. The apparatus of claim 1, wherein the controlling unit displays that the HIM is in an abnormal state on a displaying unit at a time of the breakdown.

3. The apparatus of claim 1, wherein the controlling unit generates an alarm signal that the HIM is in an abnormal state at a time of the breakdown.

4. An apparatus for controlling a fan motor of an air conditioner comprising:
a hybrid induction motor (HIM) mounted at an outdoor fan for discharging warm air outwardly by rotating a fan when power is supplied thereto based on a control signal;
a temperature detecting unit for detecting a temperature of a cooling air from an evaporator in an indoor unit; and
a controlling unit for comparing the temperature of the cooling air from the evaporator with a preset temperature, for determining whether a breakdown has occurred, and for controlling power supply to the HIM based on a result of the comparison,
wherein when the temperature of the cooling air from the evaporator in the indoor unit is higher than the preset temperature, the controlling unit cuts off power supplied to the HIM.

5. The apparatus of claim 4, wherein the controlling unit displays that the HIM is in an abnormal state on a displaying unit at a time of the breakdown.

6. The apparatus of claim 4, wherein the controlling unit generates an alarm signal that the HIM is in an abnormal state at a time of the breakdown.

7. A method for controlling a fan motor of an air conditioner, the method comprising:
discharging warm air outwardly by driving a fan using a hybrid induction motor (HIM);
detecting a temperature of a cooling air from an evaporator in an indoor unit; and
comparing the temperature of the cooling air from the evaporator with a preset temperature, determining that a breakdown has occurred , and controlling a driving of the HIM based on a result of the comparison,
wherein the controlling a driving of the HIM comprises stopping the HIM when the temperature of the cooling air from the evaporator in an indoor unit is higher than the preset temperature.

8. The method of claim 7, wherein the controlling a driving of the HIM further comprises displaying that an outdoor fan is in an abnormal state at a time of the breakdown.

9. The method of claim 7, wherein the controlling a driving of the HIM further comprises generating an alarm signal that the HIM is in an abnormal state at a time of the breakdown.

10. The method of claim 7, further comprising presetting a reference temperature by which to determine whether or not a breakdown has occurred.

11. A method for controlling a fan motor of an air conditioner comprising:

discharging warm air outwardly by driving a fan using a hybrid induction motor (HIM);

detecting a temperature of a cooling air from an evaporator; and comparing the temperature of the cooling air from the evaporator with a preset temperature, determining that a breakdown has occurred, and cutting off power supply to the HIM based on a result of the comparison.

12. The method of claim 11, wherein the cutting off power supplied to the HIM comprises cutting off power supplied to the HIM when the temperature of the cooling air from the evaporator in an indoor unit is higher than the preset temperature.

13. The method of claim 11, wherein the cutting off power supplied to the HIM comprises displaying that an outdoor fan is in an abnormal state at a time of the breakdown.

14. The method of claim 11, wherein the cutting off power supplied to the HIM comprises generating an alarm signal that the HIM is in an abnormal state at a time of the breakdown.

15. The method of claim 11, further comprising presetting a reference temperature by which to determine whether or not the breakdown has occurred.

* * * * *